United States Patent
Parsons

[15] 3,695,495
[45] Oct. 3, 1972

[54] CARRIAGE FOR SKIS

[72] Inventor: Ronald W. Parsons, Newmarket, Ontario, Canada

[73] Assignee: Allcock, Laight & Westwood Limited, Bramalea, Ontario, Canada

[22] Filed: Oct. 28, 1970

[21] Appl. No.: 84,770

[52] U.S. Cl..............................224/29 R, 224/42.1 F
[51] Int. Cl................................................B60r 9/00
[58] Field of Search........224/42.1 E, 42.1 F, 42.1 R, 224/42.1 D, 29 R, 42.1 G

[56] References Cited

UNITED STATES PATENTS

| | | |
|---|---|---|
| 3,333,750 | 8/1967 | Porter..........................224/29 |
| 2,970,728 | 2/1961 | Haas, Jr. ............224/42.1 R X |
| 2,777,727 | 1/1957 | Reilly....................224/29 R X |
| 3,550,825 | 12/1970 | Collier......................224/29 R |
| 3,378,182 | 4/1968 | McMiller.....................224/29 |
| 3,215,323 | 11/1965 | Bonitt..........................224/29 |

FOREIGN PATENTS OR APPLICATIONS 765,679   8/1967   Canada.................224/42.1 F Primary Examiner—Gerald M. Forlenza
Assistant Examiner—Frank E. Werner
Attorney—Sim & McBurney

[57] ABSTRACT

A ski carrier is provided for mounting on a trunk lid of a motor vehicle. The carrier includes a first and second ski holders spaced apart from each other and capable of holding skis in substantially fixed relation to the holders. The holders are mounted on the trunk lid by mounting means including feet which engage and are held by the sides and at least one of ends of the trunk lid. At least one of the mounting means having feet engaging the sides of the trunk lid is adjustable to accommodate trunk lids of varying width.

13 Claims, 5 Drawing Figures

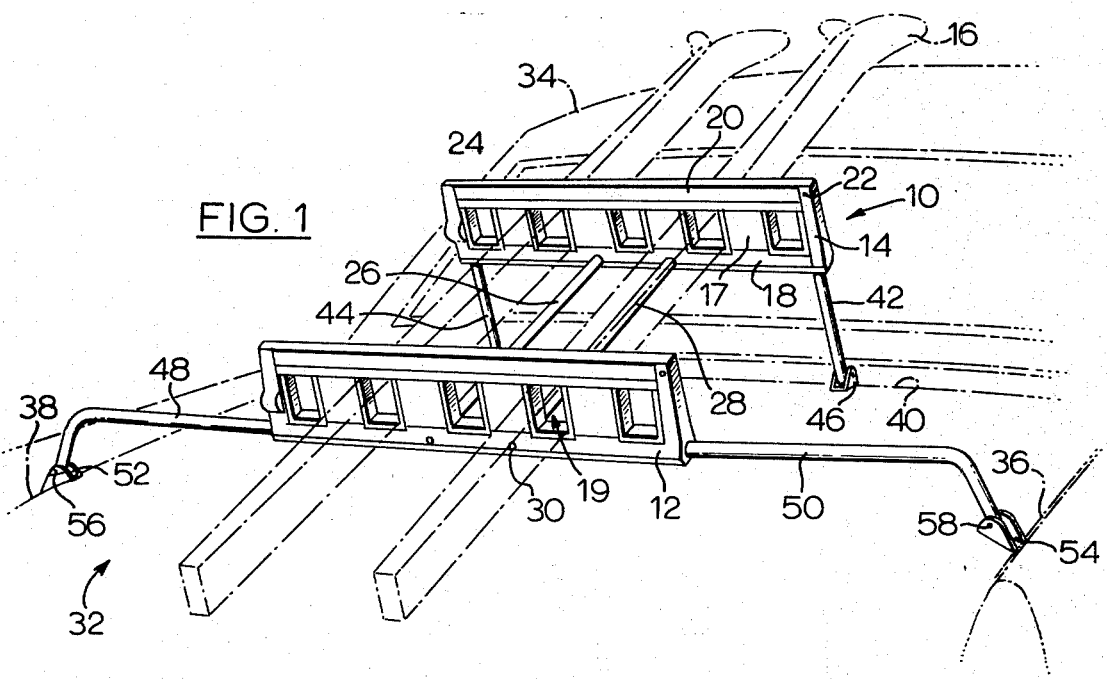
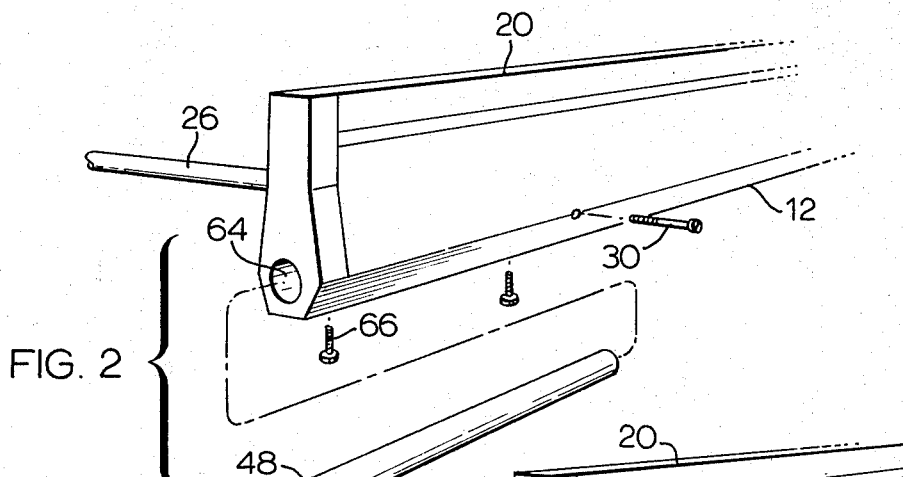
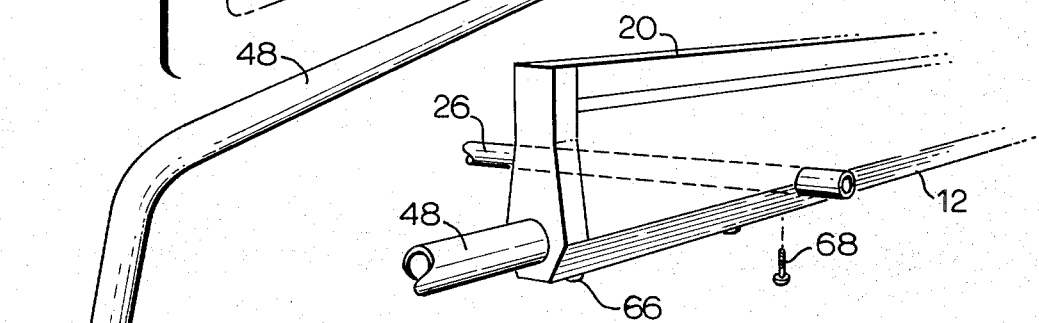
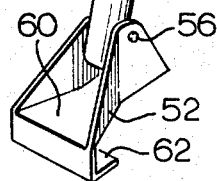
INVENTOR.
RONALD W. PARSONS

INVENTOR.
RONALD W. PARSONS

BY

Agents

CARRIAGE FOR SKIS

The present invention relates to carriers for skis, more particularly to a ski carrier for mounting on the trunk lid of a motor vehicle.

Ski carriers of many kinds have been proposed and some have been mounted on trunk lids of motor vehicles. The latter type have suffered from various disadvantages. For example, carriers have been provided with suction cups and flexible straps with hooks to attach the carrier to the trunk lid. These carriers are unsatisfactory in that the suction cups and/or the straps may break and the carrier thereby become dislodged from the vehicle, causing damage to skis and carrier if the motor vehicle is in motion. Further, the suction cups may cause damage to paint work of the trunk lid. Another prior art carrier involves the use of mountings which are fixedly attached to the trunk lid. Such attachment requires the drilling of holes in the trunk lid and the leaving of the carrier in place permanently.

The present invention provides a ski carrier which may be removed from the trunk lid when not required for use and is adjustable to accommodate different dimensions of trunk lid.

In accordance with the present invention, the mounting means for the ski holders include feet which engage and are held by sides and at least one of the ends of the trunk lid. The mounting means are adjustable to accommodate trunk lids of varying widths.

The present invention is illustrated by the accompanying drawings, in which:

FIG. 1 is a perspective view of one embodiment of a ski carrier according to the present invention mounted on the trunk of a motor vehicle;

FIG. 2 is a perspective part exploded view of one of the mounting elements of the carrier of FIG. 1;

FIG. 3 is a detail of an alternative form of the mounting element of FIG. 2;

Figure 4:
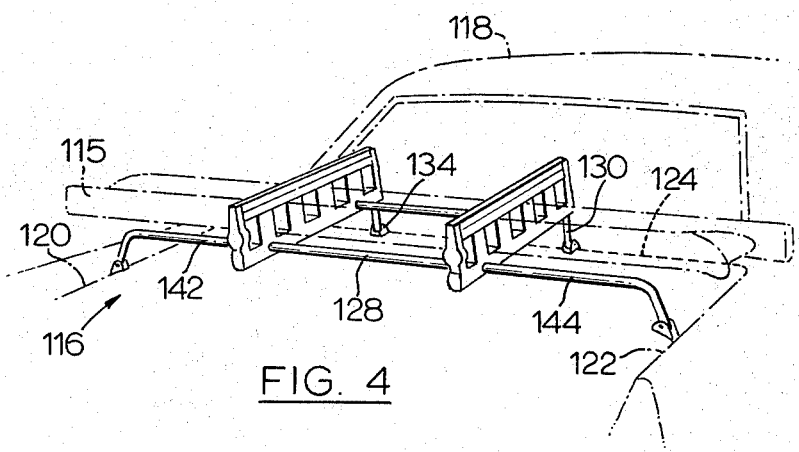
FIG. 4 is a perspective view of a second embodiment of the invention mounted on the trunk of a motor vehicle.

Referring to the embodiment of FIGS. 1 and 2, a ski carrier 10 includes a first ski holder 12 and a second ski holder 14 spaced apart from the first ski holder 12. The ski holders 12 and 14 may cooperatively receive and hold skis 16, shown in broken outline, in substantially fixed relation thereto.

The ski holders 12 and 14 are of the same construction and include a comb part 18 including upward projections 17 and depressions 19 therebetween. A retaining cross-bar 20 latches to the comb part 18 and is pivoted thereto at 22. The retaining bar 20, if desired, may be provided with a lock to prevent theft of the skis mounted in the carrier.

The depressions 19 are provided with liners 24, for example, constructed of nylon, to prevent scratching or otherwise marring of the surface of the skis. The holders 12 and 14 are designed so that the skis 16 are held with their upper surfaces resiliently abutting the sides of the projections 17 by virtue of the camber of the skis.

The holders 12 and 14 illustrated represent just one form of those which may be employed with the invention. Other known forms of ski holder may be employed within the scope of the invention to maintain the skis in fixed relation to the holders. For example, retaining stops or a simple locking bar may be employed. It is preferred to employ the holders illustrated, since these represent a very convenient mode of holding skis, which do not have the drawbacks of other holders. In this latter regard, straps tend to become cold and stiff and eventually break while a simple locking bar across the surface of the skis tends to make a sail of the skis and this sail effect tends to lift the carrier off the trunk lid.

The holders 12 and 14 are spaced apart by tubular spacing members 26 and 28 which are shown affixed to the holder 12 by screws 30. The members 26 and 28 are affixed to holder 14 in like manner. It is not necessary to provide spacing members 26 and 28 since the skis will combine with the holders 12 and 14 to maintain a spaced-apart relation between the holders.

The carrier 10 is mounted on the trunk lid 32 of a motor vehicle 34 shown in broken outline. The trunk lid has sides 36 and 38 and one of the ends 40 is shown. The holders are mounted on the trunk lid 32, in the manner hereinafter described.

The holder 14 has tubular legs 42 and 44 which project downwardly and terminate in feet, only one of which, 46, is shown. The feet are pivoted to the legs. The provision of a pivot may be omitted, if desired, but its presence adds to the versatility of the carrier, as will become apparent hereinafter.

The holder 12 has tubular legs 48 and 50 which project outwardly from the holder and then downwardly and terminate in feet 52 and 54. The feet 52 and 54 are pivoted to the arms 48 and 50 at 56 and 58 respectively. As in the case of the feet attached to the legs 42 and 44, the pivots may be omitted, but are preferred.

The feet utilized are constructed in similar manner and engage and are held by the sides and one end of the trunk lid 32. FIG. 2 shows one of the feet in detail. This foot 52 includes a trunk lid upper surface engaging portion 60 and a bracket portion 62 which projects underneath the lid. Therefore, upon closing the trunk lid of the motor vehicle, a portion of the foot engages both the upper and lower surface of the trunk lid.

Such a construction of the feet represents only one embodiment of the invention. Clearly, other feet which can engage and be held by the trunk lid are employable.

The feet are pivoted to the respective legs so that they may accommodate different trunk lid shapes adjacent the point of engagement with the sides and the ends.

The engagement of the feet of the mounting and the sides and one end of the trunk lid ensures that the holders are mounted on and fixed relative to the trunk lid and the carrier will not alter its position during motion of the motor vehicle; also once the trunk lid is closed and locked the carrier is locked to the car.

The legs 48 and 50 are slidable in tubular sockets in the holder 12. As is more clearly seen in FIG. 2, the leg 48 is slidable in the tubular socket 64. This capability of the legs to slide in sockets in the holder 12 allows the distance between the feet 52 and 54 to be adjusted to accommodate a given width of trunk lid. The versatility of the mounting of the ski carrier of the invention to adjust to varying widths of trunk lid is an important feature of the carrier.

In the embodiment illustrated, both of the legs 48 and 50 are slidable in sockets in holder 12. It is possible to provide within the scope of the invention a carrier in which only one of the arms is adjustable.

Having adjusted the distance between the feet 52 and 54 to that desired, the legs 48 and 50 may be locked relative to the holder 12 by use of screws 66 or by any other convenient locking means.

Additionally, the tubular legs 48 and 50 may be rotated in their respective sockets in the holder 12 in order to adjust the holder to a desired rake.

Referring now to FIG. 3, the tubular spacer 26 and the holder 12 of FIGS. 1 and 2 are constructed to allow the distance between the holders 12 and 14 to be adjusted. This is an alternative to the fixed distance between the holders in FIGS. 1 and 2. Spacer 26 passes through an opening in the holder 12. An opening also is provided in the holder to allow spacer 28 to pass therethrough. In this way, the holder 12 may be moved nearer to or farther away from holder 14 by sliding on spacers 26 and 28.

While the holder 12 only is shown having openings for the spacers to pass through, it is possible also to provide similar openings in holder 14. Further, it may be desirable to provide openings only in holder 14.

A locking screw 68 or other locking means is provided to lock the spacer 26 relative to the holder 12. A similar locking device may be provided for spacer 28. The distance between the holders 12 and 14 in this way may be fixed at the desired distance.

The legs 42, 44, 48 and 50 and the spacers 26 and 28 all are illustrated as tubular members. Clearly any other desirable shape or form may be employed. For reasons of lightness, corrosion resistance and mechanical strength, it is desirable to employ aluminum tubing for the legs and spacers. The holders 12 and 14 also may be constructed of aluminum, with the exception of the liners 24. It is possible, however, to employ any convenient construction material.

Further, the feet may be constructed of aluminum, but it may be beneficial to utilize a mechanically strong synthetic polymeric material, such as nylon or polypropylene, either as a coating on a foot constructed of metal, or as the material of construction of the foot, in order to minimize damage to paint work upon mounting of the carrier on the trunk lid.

It will be seen that the ski carrier of the invention does not require the use of suction cups or the drilling of holes to receive permanent mounts. The carrier of the invention, by contrast, may be mounted in temporary and yet entirely sturdy manner on the trunk lid of the motor vehicle. Further, the carrier may be adjusted to accommodate varying widths and contours of trunk lids.

The embodiment of the invention of FIGS. 1 and 2 is suitable for the carrying of skis in the longitudinal direction of the motor vehicle. The embodiment of the invention of FIGS. 4 and 5 is suitable for the carrying of skis across the trunk lid.

Figure 5:
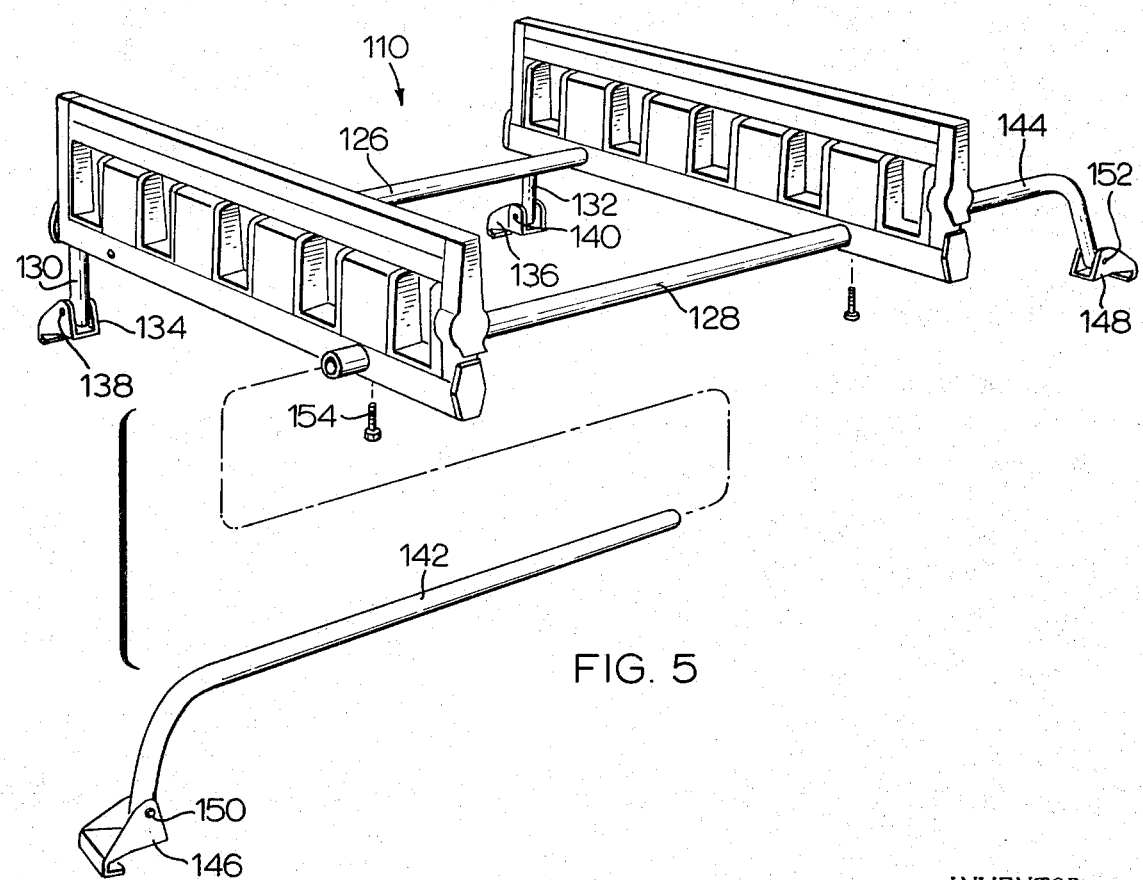
FIG. 5 is a close-up, part exploded view of the carrier of FIG. 4.

In FIGS. 4 and 5, a carrier 110 includes first and second holders 112 and 114 spaced apart from each other and holding skis 115 shown in broken outline. The construction of the holders 112 and 114 is the same as that of holders 12 and 14 and will not be described further.

The carrier is mounted on the trunk lid 116 of a motor vehicle 118. The trunk lid 116 has sides 120 and 122 and an end 124 is shown.

The holders 112 and 114 are spaced apart by tubular spacers 126 and 128.

The spacer 126 is affixed to the holders 112 and 114, although openings may be provided in at least one of the holders, if desired, to allow the spacer to project through. In the latter case, the distance between the holders may be varied. The spacer 128 is illustrated projecting through an opening in holder 112 and a similar projection occurs through holder 114.

Legs 130 and 132 project downwardly from one end of each of holders 112 and 114 and terminate at their lower end in feet 134 and 136 respectively. The feet 134 and 136 are pivoted at 138 and 140 respectively to the legs 130 and 132. The feet engage and are held by the end 124 of the trunk lid.

Legs 142 and 144 project outwardly from the other end of each of the holders 112 and 114 and then downwardly, terminating respectively in feet 146 and 148. Feet 146 and 148 are pivoted to legs 142 and 144 respectively at 150 and 152. The feet 146 and 148 engage and are held by the sides 120 and 122 respectively of the trunk lid.

The feet 134, 136, 146 and 148 are of similar construction and have the same construction as for feet 52 in FIG. 2 and no further description of their construction will be made.

Legs 142 and 144 slide in telescoping manner one in each end of spacer 128. In this manner, the distance between the feet 146 and 148 may be adjusted to accommodate the particular given width of trunk lid. To fix the relative locations of the legs 142 and 144 and the spacer 128, locking screws 154 or other convenient locking means are provided which may project through holes provided in spacer 128.

While in the embodiment illustrated both of the legs 142 and 144 are telescopable with the spacer 128, it is within the scope of the invention to provide only one of the arms with telescoping capability.

The provision of feet 134 and 136 in engagement with and held by the end 124 of the trunk lid and the provision of feet 146 and 148 in engagement with and held by the sides 120 and 122 of the trunk lid ensures that the holders are mounted on and fixed relative to the trunk lid. The carrier will not alter its position on the trunk lid during motion of the motor vehicle.

The embodiment of the invention illustrated in FIGS. 4 and 5 therefore provides a ski carrier which can be temporarily, but sturdily, mounted on a trunk of a motor vehicle so that the skis project across the width of a motor vehicle, and is adjustable to accommodate different widths and contours of trunk. This embodiment is particularly useful for use with full size North American cars in which the skis will not overlap the sides of the vehicle. This embodiment avoids some of the rear view vision problems which may be associated with the embodiment of FIGS. 1 and 2.

Modifications are possible within the scope of the invention.

What I claim is:

1. A ski carrier for mounting on a trunk lid of a motor vehicle, the trunk lid having sides and ends, comprising a ski holder assembly including a first ski holder and a second ski holder spaced apart from said first ski holder, said first and second ski holders being adapted cooperatively to receive and hold skis in substantially fixed relation to said first and second ski holders, and mounting means associated with said first and second holders for mounting said assembly on said trunk lid, said mounting means including a first pair of legs, each of said first pair of legs having a foot mounted thereto at one end thereof, one member of said first pair of legs extending from a first side of said assembly and the other member of said first pair of legs extending from a second side of said assembly parallel with said first side, the feet on said first pair of legs thereby being adapted to engage opposite sides of said trunk lid, and said feet being adapted to be held by said sides in the absence of auxiliary holding means when in said engagement, said mounting means additionally including a second pair of legs, each of said second pair of legs having a foot mounted thereon at one end thereof, both members of said second pair of legs extending from a third side of said assembly which is perpendicular to said first and second sides, the feet on said second pair of legs thereby being adapted to engage one end of said trunk lid, and said latter feet being adapted to be held by said one end in the absence of auxiliary holding means when in said engagement, and in the absence of auxiliary holding means, said holder assembly is fixed relative to said lid and is prevented from movement relative to said lid, at least one of said first pair of legs being adjustable to accommodate trunks of varying width.

2. The ski carrier of claim 1 including spacing means to maintain said first and second ski holder spaced apart from each other.

3. The ski carrier of claim 1, wherein said first pair of legs engages at one end thereof said first ski holder, said second pair of legs is attached at one end thereof to said second ski holder.

4. The ski carrier of claim 1, wherein one of said first pair of legs engages at one end thereof one end of said first ski holder, the other of said first pair of legs engages at one end thereof one end of said second ski holder, one of said second pair of legs is attached at one end thereof to the other end of said first ski holder, and the other of said second pair of legs is attached at one end thereof to the other end of said second ski holder,.

5. The ski carrier of claim 4 wherein said one ends of said ski holders are provided with sockets, said first pair of legs are movable in said sockets whereby the distance between said first and second feet may be varied.

6. The ski carrier of claim 5 including locking means for locking said first pair of legs relative to said sockets.

7. The ski carrier of claim 5 wherein said first pair of legs and said sockets are shaped to allow rotation of said legs in said sockets.

8. The ski carrier of claim 4 wherein said legs are pivoted to said feet.

9. A ski carrier for mounting on a trunk lid of a motor vehicle, the trunk lid having sides and ends, comprising a first ski holder, a second ski holder spaced apart from said first ski holder, said first and second ski holders being adapted cooperatively to receive and hold skis in substantially fixed relation to said first and second ski holders, spacing means to maintain said first and second ski holder spaced apart from each other, and mounting means associated with said first and second holders for mounting said holders on said trunk lid, said mounting means including feet, said feet being adapted to engage and be held by said sides and at least one of said ends, at least one of said mounting means having feet engaging said sides being adjustable to accommodate trunk lids of varying width, at least one of said first and second ski holders being movable relative to said spacing means, whereby the distance between said first and second ski holders may be varied.

10. A ski carrier for mounting on a trunk lid of a motor vehicle, the trunk lid having sides and ends, comprising a first ski holder, a second ski holder spaced apart from said first ski holder, said first and second ski holders being adapted cooperatively to receive and hold skis in substantially fixed relation to said first and second ski holders, and mounting means associated with said first and second holders for mounting said holders on said trunk lid, said mounting means including first and second legs attached at one end thereof to said first ski holder and at the other end to first and second feet, said first and second feet being adapted to engage and be held by one of said ends of said trunk lid, said mounting means additionally including third and fourth legs engaging at one end thereof said second ski holder and attached at the other end thereof to third and fourth feet, said third and fourth feet being adapted to engage and be held by one of said sides of said trunk lid, said second ski holder being provided with sockets, said third and fourth legs being movable in said sockets, whereby the distance between said third and fourth feet may be varied.

11. The ski carrier of claim 10 including locking means for locking said third and fourth legs relative to said sockets.

12. The ski carrier of claim 10 wherein said third and fourth legs and said sockets in said second ski holder are shaped to allow rotation of said legs in said sockets.

13. A ski carrier for mounting on a trunk lid of a motor vehicle, the trunk lid having sides and ends, comprising a first ski holder, a second ski holder spaced apart from said first ski holder, said first and second ski holders being adapted cooperatively to receive and hold skis in substantially fixed relation to said first and second ski holders, and mounting means associated with said first and second holders for mounting said holders on said trunk lid, said mounting means including first and second legs attached at one end thereof to said first ski holder and at the other end to first and second feet, said first and second feet being adapted to engage and be held by one of said ends of said trunk lid, said mounting means also including third and fourth legs engaging at one end thereof said second ski holder and attached at the other end thereof to third and fourth feet, said third and fourth feet being adapted to engage and be held by one of said sides of said trunk lid, said legs being pivoted to said feet.

* * * * *